US008049353B1

(12) United States Patent
Eng et al.

(10) Patent No.: US 8,049,353 B1
(45) Date of Patent: Nov. 1, 2011

(54) STACKABLE GENERATOR ARRANGEMENT

(75) Inventors: Darryl S Eng, Loxahatchee, FL (US); John E Ryznic, Palm Beach Gardens, FL (US); Joseph Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 620 days.

(21) Appl. No.: 12/138,511

(22) Filed: Jun. 13, 2008

(51) Int. Cl.
*F02N 11/12* (2006.01)
*F02C 3/10* (2006.01)

(52) U.S. Cl. ............................ 290/52; 290/1 A; 60/791

(58) Field of Classification Search .................... 290/52, 290/1 A, 4 R, 1 C, 4 C; 60/659, 676, 791, 60/788
See application file for complete search history.

(56) References Cited

U.S. PATENT DOCUMENTS 4,347,706 A * 9/1982 Drost .............................. 60/659
5,555,722 A * 9/1996 Mehr-Ayin et al. ............. 60/788
6,735,951 B2 * 5/2004 Thompson ...................... 60/774
6,748,737 B2 * 6/2004 Lafferty .......................... 60/398
6,900,553 B2 * 5/2005 Gozdawa ........................ 290/52
7,105,938 B2 * 9/2006 Edelson ...................... 290/40 A
7,513,120 B2 * 4/2009 Kupratis ......................... 60/791
7,683,497 B2 * 3/2010 Gozdawa ...................... 290/4 R
2009/0193785 A1 * 8/2009 Siden et al. .................. 60/39.15

* cited by examiner

*Primary Examiner* — Nicholas Ponomarenko
(74) *Attorney, Agent, or Firm* — John Ryznic

(57) ABSTRACT

A electrical power plant with a gas turbine engine that drives two electric high speed generators connected on the two ends of the engine rotor shaft in a direct drive relation without the need for a gear box. The high speed generators can be of the same or different power rating and connected in series such that the total power output can easily be changed without the need to redesign larger high speed generators. Because the generators use permanent magnets, they can be operated as motors to drive two or more compressors. A turbine can be used to drive two or more high speed generators connected in series. Since the high speed generator/motors have thrust bearings, the thrust bearing in the turbomachine can be eliminated.

6 Claims, 1 Drawing Sheet

STACKABLE GENERATOR ARRANGEMENT

FEDERAL RESEARCH STATEMENT

None.

CROSS-REFERENCE TO RELATED APPLICATIONS

None.

BACKGROUND OF THE INVENTION

1. Field of the Invention

The present invention relates generally to electrical power production, and more specifically to a small gas turbine engine driving a number of small generators.

2. Description of the Related Art Including Information Disclosed Under 37 CFR 1.97 and 1.98

Electric power is produced in a large power plant using a large industrial gas turbine engine to drive a large electric generator to produce power in the megawatt and higher range. This type of electric power plant is good for providing electricity to a large number of houses but not practicable for small scale use. In some situations, a small electric generator is required to provide electrical power to a single user in the range of less than one megawatt. Diesel engines are used to drive a standby electrical generator to provide power in the case of an emergency, for example, to a hospital or a grocery store when the main source of power has been interrupted.

Because of the recent increase in the price of fuel, diesel engines are beginning to be replaced by small gas turbine engines. A gas turbine engine has about twice the efficiency of the diesel engine. However, a small gas turbine engine rotates at very high speeds compared to a diesel engine. For this reason, a typical electric generator requires a reduction gear box to step down the rotation speed from the engine to the generator in order to meet the generator speed rating. The addition of a reduction gear box not only requires oil for lubrication but also reduces the overall efficiency of the power plant because of the loss through the gears.

Small electric generator of the 400 kW range that operates at very high speeds (greater than 3,600 rpm) is known in the art of electric generators. Regular generators operate at 3,600 rpm in order to produce 60 hertz electrical current without the need of a reduction gear box. These high speed generators are used with a direct drive that eliminates the need for a gearbox and oil lubrication system. These high speed generators uses efficient permanent magnet motor/generator in which the generator can also operate as a motor. Because of the type of magnet used, the generator/motor can be used in close proximity to a high temperature device, thus making these high speed generators ideal for use with a small gas turbine engine for electric power production. Also, these prior art generators are designed to operate at a certain high speed in order to generate the maximum amount of electric power. Some high speed generator/motors might be designed to produce 200 kW while others might be designed to pro duce 300 kW or 400 kW of electric power and all are designed to operate at the same high rotation speed.

The high speed generators are a complex machine designed for a specific power level such as in the 400 kW range. The problem is, when higher power is required, a new generator must be designed for this higher power output. For example, when the situation requires 600 kW, the 400 kW generator is not large enough. Therefore, a new design of the generator is required in which 600 kW will be delivered. This is very costly and time consuming.

Also, a compressor can be driven by an electric motor to produce compressed gas. And, a turbine can drive an electric generator to produce electric power. In each of these cases, the compressor and the turbine requires a thrust bearing assembly to counteract the resulting axial force developed from the compression or the expansion of the gas. The prior art high speed motor/generator unit described above includes a magnetic bearing assembly for dynamic force compensation, flux command, inertial balance and magnetic balance.

U.S. Pat. No. 1,066,209 issued to Ljungstrom on Jul. 1, 1913 and entitled TURBINE GENERATOR shows a steam turbine connected to two electric generators located on the ends of the turbine that provide support for the turbine. U.S. Pat. No. 4,616,140 issued to Bratt on Oct. 7, 1986 and entitled SYSTEM AND A METHOD FOR CONVERSION OF SOLAR RADIATION INTO ELECTRIC POWER shows a solar collector mirror with a hot gas engine driven by heat reflected off of the mirror and two generators connected on the ends of the engine. U.S. Pat. No. 2,110,142 issued to Wilkinson on Mar. 8, 1938 and entitled POWER TRANSMISSION SYSTEM FOR WELL DRILLING AND THE LIKE shows a prime mover connected to two generators on each side to produce electric power. In each of the above inventions, the generator is not designed to be easily fitted to the driving motor and the generator does not have the capability to connect to an additional generator on the side opposite to the driving motor.

BRIEF SUMMARY OF THE INVENTION

It is an object of the present invention to provide for an electric power plant in which more than one high speed generator of similar speed rating can be stacked in series to produce high levels of electric power.

It is another object of the present invention to provide for a turbomachine that drives or is driven by a machine in which the machine includes the thrust bearing assembly in order to eliminate a thrust bearing assembly in the turbomachine.

It is another object of the present invention to provide for an electric power plant that can be easily increased in power output without the need for re-engineering of the generator to a higher electrical power output.

It is another object of the present invention to provide for a small gas turbine engine power plant in which the engine does not require a thrust bearing.

It is another object of the present invention to provide for an electrical power plant in which a number of high speed generators having similar designed operating speed ranges are connected in series to produce more electrical power than a single high speed generator.

The present invention is a portable electric power plant in which a generator having a designed power output is stacked in series on the rotor shaft of the engine such that the total power output is a multiple of the power rating for a single generator. The generators are connected on both sides of the engine so that thrust bearings in the compressor and the turbine of the engine can be eliminated.

In another embodiment, a turbomachine such as a compressor or a turbine is connected to a series of generators/motors. Because the prior art high speed generator is also capable of operating as a motor, a compressor can be driven by two or more of the generator/motor machines. A turbine can be connected to a series of the generators to produce electrical power. When a higher power output is required, an additional generator can be connected to increase the output without having to install a larger generator capable of producing the higher power output. In both cases, a thrust bearing assembly in the compressor or the turbine is eliminated because the generator/motor has a thrust bearing that can also be used to balance the rotor shaft in the turbomachine.

DETAILED DESCRIPTION OF THE INVENTION

Figure 1:
FIG. 1 shows a cross section of the present invention with a gas turbine engine connected to two generators.

The present invention makes use of the high speed efficient permanent magnetic motor/generator with a turbomachine, such as a compressor or a turbine, or with a small gas turbine engine in which the generators/motors are connected in series in order to produce more power than a single generator/motor is capable of producing by itself. FIG. 1 shows a small gas turbine engine with a compressor and a turbine that is used to produce electrical power. A first generator is connected to the shaft of the turbine and a second generator is connected to the shaft of the compressor. Operation of the engine drives both generators and produces electric power. In the case of the prior art high speed generator, each produces 400 kW of electrical power. In the FIG. 1 embodiment, the gas turbine engine is used to drive two generators for producing 800 kW of electrical power. In the case where more than 400 kW is required, such as 600 kW, the addition of the second generator eliminates the need to redesign a generator that is capable of producing the 600 kW. This makes it very economical to upgrade the total power output of the gas turbine driven power plant for use in situations that require small amounts of power. The use of the prior art high speed generators also allows for the elimination of the thrust bearing assemblies required in the compressor and/or the turbine to balance the thrust loads during engine operation. Also, a speed reduction gear box is not required and therefore the power plant is reduced in complexity and the efficiency is increased.

Figure 2:
FIG. 2 shows a cross section of the present invention with the gas turbine engine of FIG. 1 connected to four generators.

The prior art high speed generator/motors are to be adapted so that the shaft ends on both sides of the generator/motors can be connected to another generator/motor to produce a series of generator/motors. This makes the installation and replacement of the generator/motors easy for the situation where the power output must be increased beyond the capability of the existing generator/motors. When the electrical power output required increases, additional generator units can be installed onto the shafts of other generators as seen in FIG. 2 to provide for increased power levels without adding larger generators. Therefore, no further engineering redesign is required to increase the power output of the system.

Figure 3:
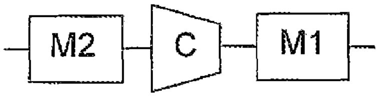
FIG. 3 shows a cross section of the present invention a compressor connected to two generators.

FIG. 3 shows an embodiment in which two of the generator/motor units are connected to a single compressor and operate as motors to drive the compressor. If a larger compressor is required, instead of driving the compressor with a larger motor, a second motor unit can be connected to the compressor shaft so that a standard motor unit can be used to drive the compressor without having to design or acquire a larger motor. Also, because the prior art high speed generator/motor units have build-in thrust balancers, the compressor can be design without thrust balancing assembly. The thrust balance assembly in the motor units can be used to balance the thrust for the compressor.

Figure 4:
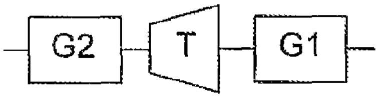
FIG. 4 shows a cross section of the present invention a turbine connected to two generators.
Figure 5:
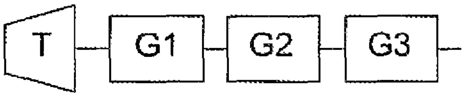
FIG. 5 shows a cross section of the present invention with a turbine connected to a series of from two to four generators.

FIG. 4 shows an embodiment of the present invention in which a turbine is connected to two prior art high speed generators to produce 800 kW of electrical power. The turbine can be designed without thrust balancers since the generator units have thrust balancers build-in that can also be used to provide thrust balancing for the turbine. Additional generator units can be connected in series to the rotor shaft of the turbine through the already connected generator units in order to produce more electrical power as seen in the FIG. 5 embodiment. The same additional motor units can be connected to the compressor embodiment to drive a larger compressor.

Figure 6:
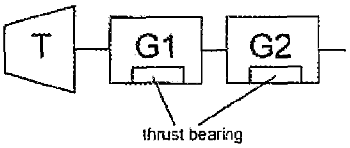
FIG. 6 shows a cross section of the present invention with a turbine connected to two generators in which the thrust bearing assembly is located in the generators and not the turbine.
Figure 7:
FIG. 7 shows a single motor/generator unit with shafts extending out from both sides.

FIG. 6 shows the generator units with thrust balancers in each unit that are used to provide thrust balancing for the turbine unit. As described above, the thrust balancing assembly in the turbine can be eliminated.

With the present invention described above, a standard sized electric generator/motor unit can be used in multiples to increase the power input or the power output without having to design a larger unit or replace a smaller unit with a larger unit during the upgrade. This saves much time in development and high costs associated with redesign when higher power levels are required. In a small power plant of the type used for a single building, the electric power production can be easily provided for by simply adding on additional units.

We claim the following:

1. A method for increasing the electrical power generation output of a small gas turbine engine to power electric power generating plant, the power plant including:

a first high speed generator capable to be connected to either a compressor or a turbine rotor shaft; the method comprising the steps of:

obtaining a second high speed generator that operates at the same rotational speed as the first high speed generator;

connecting the second high speed generator to the compressor or the turbine rotor shaft not connected to the first high speed generator; and, operating the gas turbine engine at a power level sufficient to drive both high speed generators to produce electric power.

2. The method for increasing the electrical power generation of claim 1, and further comprising the step of:

using a second generator of the same power output rating as the first generator.

3. The method for increasing the electrical power generation of claim 1, and further comprising the step of:

using a second generator of a different power output rating than the first generator.

4. The method for increasing the electrical power generation of claim 1, and further comprising the steps of:

connecting a third high speed generator to one of the first and second high speed generators, the third generator operating at the same rotational speed as the first and second high speed generators; and, operating the gas turbine engine at a power level sufficient to drive all three generators to produce electric power.

5. The method for increasing the electrical power generation of claim 4, and further comprising the step of:

at least one of the three generators has a different power rating than the other two generators.

6. The method for increasing the electrical power generation of claim 4, and further comprising the step of:

all three generators have the same power rating.

* * * * *